(12) United States Patent
Stojanovic et al.

(10) Patent No.: US 12,043,786 B2
(45) Date of Patent: Jul. 23, 2024

(54) THERMALLY CONDUCTIVE NANOMATERIAL COATINGS ON FLEXIBLE FOAM OR FABRICS

(71) Applicant: L&P Property Management Company, South Gate, CA (US)

(72) Inventors: Heidi Stojanovic, Fort Smith, AR (US); Aubrey Nicole Scherrey, Van Buren, AR (US); Mark L. Crawford, Alma, AR (US)

(73) Assignee: L&P Property Management Company., South Gate, CA (US)

(*) Notice: Subject to any disclaimer, the term of this patent is extended or adjusted under 35 U.S.C. 154(b) by 9 days.

(21) Appl. No.: 18/163,524

(22) Filed: Feb. 2, 2023

(65) Prior Publication Data

US 2023/0174838 A1 Jun. 8, 2023

Related U.S. Application Data

(63) Continuation of application No. 17/197,193, filed on Mar. 10, 2021, now Pat. No. 11,597,862.

(51) Int. Cl.
  *C09D 5/00* (2006.01)
  *C08J 9/36* (2006.01)
  (Continued)

(52) U.S. Cl.
  CPC ............ *C09K 5/14* (2013.01); *C08J 9/365* (2013.01); *C09D 5/00* (2013.01); *C09D 7/61* (2018.01);
  (Continued)

(58) Field of Classification Search
  None
  See application file for complete search history.

(56) References Cited

U.S. PATENT DOCUMENTS 2,343,581 A   3/1944 Reeves
3,090,094 A   5/1963 Schwartzwalder et al.
(Continued)

FOREIGN PATENT DOCUMENTS

CA      2287488 C  *  4/2007  ............ B32B 5/18
KR   1020040041255    5/2004
(Continued)

OTHER PUBLICATIONS

Parker, S.P., McGraw-Hill Encyclopedia of Chemistry, McGraw-Hill, New York, pp. 818-819 (1983).
(Continued)

*Primary Examiner* — Jeffrey D Washville
(74) *Attorney, Agent, or Firm* — Wood Herron & Evans LLP (57) ABSTRACT

A flexible cellular foam or fabric product is coated with a coating including highly thermally conductive nanomaterials. The highly thermally conductive nanomaterials may be carbon nanomaterials, metallic, or non-metallic solids. The carbon nanomaterials may include, but are not necessarily limited to, carbon nanotubes and graphene nanoplatelets. The highly thermally conductive nanomaterials may include but are not limited to nano-sized solids that may include graphite flakes, for example. When coated on a surface of flexible foam, the presence of nanomaterials may impart greater thermal effusivity, greater thermal conductivity, and/or a combination of these improvements. The flexible foam product may be polyurethane foam, latex foam, polyether polyurethane foam, viscoelastic foam, high resilient foam, polyester polyurethane foam, foamed polyethylene, foamed polypropylene, expanded polystyrene, foamed silicone, melamine foam, among others.

8 Claims, 6 Drawing Sheets

(51) Int. Cl.
- *C08K 3/04* (2006.01)
- *C08K 7/00* (2006.01)
- *C09D 7/40* (2018.01)
- *C09D 7/61* (2018.01)
- *C09D 7/63* (2018.01)
- *C09K 5/06* (2006.01)
- *C09K 5/14* (2006.01)

(52) U.S. Cl.
CPC ............... *C09D 7/63* (2018.01); *C09D 7/70* (2018.01); *C09K 5/063* (2013.01); *C08J 2205/05* (2013.01); *C08J 2205/052* (2013.01); *C08J 2321/02* (2013.01); *C08J 2375/06* (2013.01); *C08J 2375/08* (2013.01); *C08K 3/04* (2013.01); *C08K 3/041* (2017.05); *C08K 3/042* (2017.05); *C08K 7/00* (2013.01); *C08K 2201/001* (2013.01); *C08K 2201/011* (2013.01)

(56) References Cited

U.S. PATENT DOCUMENTS

| | | |
|---|---|---|
| 3,097,930 A | 7/1963 | Holland |
| 3,150,109 A | 9/1964 | Ferrigno |
| 3,255,128 A | 6/1966 | Farkas et al. |
| 3,266,064 A | 8/1966 | Figman |
| 3,661,809 A | 5/1972 | Pitts et al. |
| 3,681,797 A | 8/1972 | Messner |
| 3,833,951 A | 9/1974 | Hurwitz |
| 3,925,266 A | 12/1975 | Fabris et al. |
| 3,931,062 A | 1/1976 | Cobbledick |
| 4,024,212 A | 5/1977 | Dore et al. |
| 4,452,920 A | 6/1984 | Joubert |
| 4,456,642 A | 6/1984 | Burgdorfer et al. |
| 4,572,188 A | 2/1986 | Augustine et al. |
| 4,574,411 A | 3/1986 | Yagi |
| 4,756,958 A | 7/1988 | Bryant et al. |
| 4,776,356 A | 10/1988 | Jou et al. |
| 4,807,696 A | 2/1989 | Colvin et al. |
| 4,931,479 A | 6/1990 | Morgan |
| 4,992,481 A | 2/1991 | von Bonin et al. |
| 5,007,478 A | 4/1991 | Sengupta |
| 5,232,970 A | 8/1993 | Solc et al. |
| 5,262,468 A | 11/1993 | Chen |
| 5,312,847 A | 5/1994 | De Vos |
| 5,334,646 A | 8/1994 | Chen et al. |
| 5,336,708 A | 8/1994 | Chen |
| 5,362,834 A | 11/1994 | Schaepel et al. |
| 5,366,801 A | 11/1994 | Bryant et al. |
| 5,397,808 A | 3/1995 | Doerge et al. |
| 5,441,476 A | 8/1995 | Kitado et al. |
| 5,449,654 A | 9/1995 | Prin et al. |
| 5,499,460 A | 3/1996 | Bryant et al. |
| 5,508,334 A | 4/1996 | Chen |
| 5,555,579 A | 9/1996 | Wu |
| 5,568,659 A | 10/1996 | Fogel |
| 5,637,389 A | 6/1997 | Colvin et al. |
| 5,656,344 A | 8/1997 | Sawa et al. |
| 5,674,606 A | 10/1997 | Powers, Jr. |
| 5,722,482 A | 3/1998 | Buckley |
| 5,749,111 A | 5/1998 | Pearce |
| 5,760,117 A | 6/1998 | Chen |
| 5,804,297 A | 9/1998 | Colvin et al. |
| 5,851,338 A | 12/1998 | Pushaw |
| 5,884,639 A | 3/1999 | Chen |
| 5,908,871 A | 6/1999 | Frey et al. |
| 5,944,389 A | 8/1999 | Zenba et al. |
| 5,955,188 A | 9/1999 | Pushaw |
| 6,004,662 A | 12/1999 | Buckley |
| 6,025,067 A | 2/2000 | Fay |
| 6,048,810 A | 4/2000 | Baychar |
| 6,051,624 A | 4/2000 | Bastin et al. |
| 6,063,825 A | 5/2000 | Isobe et al. |
| 6,085,369 A | 7/2000 | Feher |
| 6,103,152 A | 8/2000 | Gehlsen et al. |
| 6,117,176 A | 9/2000 | Chen |
| 6,121,336 A | 9/2000 | Okoroafor et al. |
| 6,183,855 B1 | 2/2001 | Buckley |
| 6,235,801 B1 | 5/2001 | Morales et al. |
| 6,265,457 B1 | 7/2001 | Dolgopolsky et al. |
| 6,319,599 B1 | 11/2001 | Buckley |
| 6,387,973 B1 | 5/2002 | Saleh et al. |
| 6,425,527 B1 | 7/2002 | Smole |
| 6,497,720 B1 | 12/2002 | Augustine et al. |
| 6,498,198 B2 | 12/2002 | Pearce |
| 6,602,925 B1 | 8/2003 | Van Den Bosch et al. |
| 6,687,937 B2 | 2/2004 | Harker |
| 6,698,510 B2 | 3/2004 | Serra et al. |
| 6,699,266 B2 | 3/2004 | Lachenbruch et al. |
| 6,720,362 B1 | 4/2004 | Park |
| 6,765,031 B2 | 7/2004 | Salyer et al. |
| 6,772,825 B2 | 8/2004 | Lachenbruch et al. |
| 6,855,410 B2 | 2/2005 | Buckley |
| 6,855,742 B2 | 2/2005 | Hager et al. |
| 6,887,809 B1 | 5/2005 | Adler |
| 6,908,979 B2 | 6/2005 | Arendoski |
| 7,077,990 B2 | 7/2006 | Miller |
| 7,093,599 B2 | 8/2006 | Chen |
| 7,138,175 B2 | 11/2006 | Saito |
| 7,178,866 B1 | 2/2007 | Scott |
| 7,191,478 B2 | 3/2007 | Schmidt |
| 7,193,002 B2 | 3/2007 | Chen |
| 7,222,380 B2 | 5/2007 | Chen |
| 7,226,484 B2 | 6/2007 | Chen |
| 7,234,560 B2 | 6/2007 | Chen |
| 7,344,568 B2 | 3/2008 | Chen |
| 7,361,695 B2 | 4/2008 | Tu et al. |
| 7,520,012 B2 | 4/2009 | Robins |
| 7,661,164 B2 | 2/2010 | Chen |
| 7,727,267 B2 | 6/2010 | Lachenbruch |
| 7,737,192 B2 | 6/2010 | Yano |
| 7,744,991 B2 | 6/2010 | Fischer et al. |
| 7,793,372 B2 | 9/2010 | Lean et al. |
| 7,827,704 B2 | 11/2010 | Fox et al. |
| 7,930,782 B2 | 4/2011 | Chen |
| 8,070,876 B1 | 12/2011 | Jiang |
| 8,293,808 B2 | 10/2012 | Herrington et al. |
| 8,568,632 B2 | 10/2013 | Rynd et al. |
| 8,875,472 B2 | 11/2014 | Korwin-Edson et al. |
| 8,933,139 B1 | 1/2015 | Peterson et al. |
| 8,933,140 B2 | 1/2015 | Peterson et al. |
| 8,993,140 B2 | 3/2015 | Schiemann et al. |
| 9,012,522 B2 | 4/2015 | Alcazar Jorba et al. |
| 9,023,907 B2 | 5/2015 | Frei et al. |
| 9,534,098 B2 | 1/2017 | Peterson et al. |
| 10,202,499 B2 | 2/2019 | Crawford et al. |
| 10,209,499 B2 | 2/2019 | Shibata et al. |
| 10,329,469 B2 | 6/2019 | Peterson et al. |
| 10,526,518 B2 | 1/2020 | Peterson et al. |
| 10,597,531 B2 | 3/2020 | Prissok et al. |
| 2001/0018466 A1 | 8/2001 | Gansen et al. |
| 2001/0056129 A1 | 12/2001 | Stender et al. |
| 2002/0031659 A1 | 3/2002 | Gansen et al. |
| 2003/0088019 A1 | 5/2003 | Pause et al. |
| 2003/0203182 A1 | 10/2003 | Thomson |
| 2003/0220432 A1 | 11/2003 | Miller et al. |
| 2004/0097608 A1 | 5/2004 | Re'em |
| 2004/0102573 A1 | 5/2004 | Stender et al. |
| 2004/0192795 A1 | 9/2004 | Chevalier et al. |
| 2004/0204511 A1 | 10/2004 | Tokuyasu et al. |
| 2004/0229986 A1 | 11/2004 | Pearce |
| 2004/0241417 A1 | 12/2004 | Fischer et al. |
| 2004/0247852 A1 | 12/2004 | Kume et al. |
| 2005/0070620 A1 | 3/2005 | Herrington et al. |
| 2005/0208286 A1 | 9/2005 | Hartmann et al. |
| 2006/0073089 A1 | 4/2006 | Ajayan et al. |
| 2006/0110998 A1 | 5/2006 | Takenishi et al. |
| 2006/0183849 A1 | 8/2006 | Liu et al. |
| 2007/0066788 A1 | 3/2007 | Hoffmann et al. |
| 2008/0142494 A1 | 6/2008 | Blake et al. |
| 2008/0193738 A1 | 8/2008 | Hensley et al. |
| 2009/0062432 A1 | 3/2009 | Doesburg et al. |
| 2009/0142551 A1 | 6/2009 | Fox et al. |
| 2009/0212454 A1 | 8/2009 | Smith et al. |

(56) References Cited

U.S. PATENT DOCUMENTS

| | | |
|---|---|---|
| 2009/0306237 A1 | 12/2009 | Babb et al. |
| 2010/0047550 A1 | 2/2010 | Prissok et al. |
| 2010/0126981 A1 | 5/2010 | Heintz et al. |
| 2010/0175810 A1 | 7/2010 | Korwin-Edson |
| 2011/0155945 A1 | 6/2011 | Soong |
| 2011/0155946 A1 | 6/2011 | Simpson |
| 2011/0196329 A1 | 8/2011 | Eckstein et al. |
| 2012/0048528 A1 | 3/2012 | Bergin et al. |
| 2012/0070606 A1 | 3/2012 | Villata |
| 2012/0149795 A1 | 6/2012 | Schleiermacher et al. |
| 2013/0079431 A1 | 3/2013 | Smiecinski |
| 2013/0175026 A1* | 7/2013 | Chakraborty ........... B29C 44/02 |
| | | 166/228 |
| 2013/0295371 A1 | 11/2013 | Peterson et al. |
| 2014/0039082 A1 | 2/2014 | Peterson et al. |
| 2014/0141233 A1* | 5/2014 | Crawford ................ C08K 5/01 |
| | | 5/636 |
| 2014/0182063 A1 | 7/2014 | Crawford et al. |
| 2014/0183403 A1 | 7/2014 | Peterson et al. |
| 2014/0260653 A1 | 9/2014 | Merrell et al. |
| 2016/0075929 A1 | 3/2016 | Biggin et al. |
| 2017/0027168 A1 | 2/2017 | Heath |
| 2019/0077661 A1 | 3/2019 | Erb et al. |
| 2021/0316171 A1 | 10/2021 | Zhamu et al. |

FOREIGN PATENT DOCUMENTS

| | | |
|---|---|---|
| KR | 100855053 B1 | 8/2008 |
| KR | 101228077 B1 | 1/2013 |
| WO | 2005097935 A1 | 10/2005 |
| WO | 2006038761 A1 | 4/2006 |
| WO | 2009070801 A1 | 6/2009 |
| WO | 2010129647 A1 | 11/2010 |
| WO | 2011069928 A2 | 6/2011 |
| WO | 2011081485 A2 | 7/2011 |

OTHER PUBLICATIONS

Quality Foam Packaging web page, http://www.qualityfoam.com/polyester-polyurethane.asp (2014).

U.S. Patent and Trademark Office; Search Report and Written Opinion in related International Patent Application PCT/US2022/018462 dated May 18, 2022; 10 pages.

* cited by examiner

THERMALLY CONDUCTIVE NANOMATERIAL COATINGS ON FLEXIBLE FOAM OR FABRICS

CROSS-REFERENCE TO RELATED APPLICATIONS

This application is a Continuation of U.S. patent application Ser. No. 17/197,193 filed Mar. 10, 2021 (pending), the disclosure of which is incorporated by reference herein.

TECHNICAL FIELD

Typically, flexible cellular foams, such as high density polyurethane foams, have low thermal conductivities in the range of 0.02-0.04 W/(m-K) in an uncompressed state. High density polyurethane foams have a tendency to trap heat and slowly diffuse heat through conduction and convection. In particular, high density polyurethane foam such as memory foam has the tendency to "sleep hotter" than traditional flexible foam, due to reduced open void space within the high density polyurethane foam. When a person lies down on a memory foam mattress surface, the limited foam open void space decreases during compression and reduces the potential for air migration within the memory foam. As foam compression increases, convective heat transfer decreases and conductive heat transfer increases.

In previous mattress heat dissipation methods and composites designed for the same, bedding manufacturers have modified flexible cellular foam layers with various surface modifications and through-body modifications such as channeling, convoluting, and punching holes in a mattress foam layer in order to allow more air to pass through the mattress foam layer; thereby, heat is able to dissipate faster from the mattress foam layer due to more void space in the mattress foam layer. Prior methods also include forced heat dissipation methods, such as using a ventilation fan to induce cooling or a heat pump to remove heat from a foam body. Other prior methods include dispersing thermally conductive materials throughout the flexible cellular foam body.

Prior patents do not teach adding highly thermally conductive nanomaterials to flexible cellular foam surfaces to increase the foam thermal conductivity and using said increased thermally conductive flexible cellular foam as one or more layers in a bedding or seating product.

There remains a need for cellular foam, slabstock foams, molded foams, and fabrics to have improved heat dissipation.

SUMMARY

There is provided, in one non-limiting form, products and methods of forming a flexible cellular foam product, a fabric product, or an article including a flexible cellular foam product or fabric product. All of these products include highly thermally conductive nanomaterials (HTCN) coated on at least a portion thereof. Particularly, these products and articles are manufactured using water or a water-based solvent. As such, and as will be explained below, particular binders that are configured to be compatible with water-based solvents are used.

In an embodiment, the flexible cellular foam product or fabric product includes a flexible foam substrate or fabric substrate having at least one surface with a coating layer including a highly thermally conductive nanomaterials and a binder. The coating is coated on the at least one surface of flexible cellular foam product or fabric product. The binder is a water-solvent compatible binder selected from a group consisting of acrylic polymer emulsions produced from a monomer selected from a group consisting of ethyl acrylate, butyl acrylate, 2-ethylhexyl acrylate, methyl methacrylate, acrylic acid, methyl acrylate, and combinations thereof, polyvinylidene chloride latex, styrene-butadiene latex, carboxylated acrylonitrile butadiene rubber, carboxylated butadiene copolymer rubber, styrene-acrylic emulsion polymers including resin supported emulsions, vinyl-acetate based polymers such as vinyl acetate ethylene copolymers and vinyl acrylic latex, nitrile latex elastomers, nitrile-butadiene elastomers, polybutadiene elastomers produced from 1,3-butadiene elastomers, dicyclopentadiene-based elastomers, ethylene propylene dicyclopentadiene-based elastomers, neoprene binder, natural rubber binder, water-based polyurethane elastomers, starch/dextrin-based binders, protein/casein-based binders, silicone-based binders, and combinations thereof.

In another embodiment, a flexible foam substrate has a first zone and a second zone. The first zone has a first surface and a second zone having a second surface. A first coating layer overlays at least a portion of the first surface. A second coating layer overlays at least a portion of the second surface. At least one of the first and second coating layers comprises a binder and a highly thermally conductive nanomaterial, the binder binding the highly thermally conductive nanomaterial of the coating layer to the flexible foam substrate. The zones or sections may be any desired size and extend longitudinally (from head to foot) or transversely (from side-to-side). Any flexible cellular foam or fabric product may have any desired number of zones or sections.

The binder is selected from a group consisting of acrylic polymer emulsions produced from a monomer selected from a group consisting of, ethyl acrylate, butyl acrylate, 2-ethylhexyl acrylate, methyl methacrylate, acrylic acid, methyl acrylate, and combinations thereof, polyvinylidene chloride latex, styrene-butadiene latex, carboxylated acrylonitrile butadiene rubber, carboxylated butadiene copolymer rubber, styrene-acrylic emulsion polymers including resin supported emulsions, vinyl-acetate based polymers such as vinyl acetate ethylene copolymers and vinyl acrylic latex, nitrile latex elastomers, nitrile-butadiene elastomers, polybutadiene elastomers produced from 1,3-butadiene elastomers, dicyclopentadiene-based elastomers, ethylene propylene dicyclopentadiene-based elastomers, neoprene binder, natural rubber binder, water-based polyurethane elastomers, starch/dextrin-based binders, protein/casein-based binders, silicone-based binders, and combinations thereof.

In another embodiment, the flexible cellular foam product or fabric product includes a coating layer having between 0.001 wt % and 50 wt % highly thermally conductive nanomaterials.

In another embodiment, the flexible cellular foam product or fabric product includes highly thermally conductive nanomaterials having a thermal conductivity of greater than 5 W/(m-K).

In another embodiment, the flexible cellular foam product or fabric product includes a coating layer including highly thermally conductive nanomaterial selected from a group consisting of single-walled carbon nanotubes, double-walled carbon nanotubes, multi-walled carbon nanotubes, graphite nanoplatelets, graphene nanoplatelets, graphite oxide, graphene oxide, diamond nanoparticles, carbonado nanoparticles, carbon nanodots, carbon nanofibers, carbon nanotips, carbon nanowhiskers, and mixtures thereof.

In another embodiment, the flexible cellular foam product or fabric product includes a coating layer including highly thermally conductive nanomaterials selected from a group consisting of aluminum, copper, iron, steel, silver, gold, platinum, nickel, tin, chromium, vanadium, tungsten, and combinations thereof, or derivatives made from any of those materials combined with oxygen, halogens, carbon, or silicon, and any combination thereof.

In another embodiment, flexible cellular foam product or fabric product includes flexible cellular foam selected from the group consisting of an open-celled polyether polyurethane foam, closed-celled polyether polyurethane foam, partially open-celled polyether polyurethane foam, open-celled polyester polyurethane foam, closed-cell polyester polyurethane foam, partially open-celled polyester polyurethane foam, latex foam, and combinations thereof.

In another embodiment, the flexible cellular foam product or fabric product includes a coating layer including a highly thermally conductive nanomaterial coating layer present on the surface of the flexible cellular foam product or fabric product in a thickness of between 10 $g/m^2$ and 25,000 $g/m^2$.

In another embodiment, the flexible cellular foam product or fabric product includes a coating layer including a highly thermally conductive nanomaterial having an average particle size of between about 1 nm and 1,000 nm independently.

In another embodiment, the flexible cellular foam product or fabric product includes a coating layer including a property-enhancing additive selected from a group consisting of a surfactant, a plasticizing agent, a salt, a pH adjuster, an extender, a pigment, a stabilizer, a flame retardant, a phase change material, and combinations thereof.

In another embodiment, the flexible cellular foam product or fabric product includes a coating layer including a plasticizing agent selected from a group consisting of phthalate-based plasticizers comprising bis(2-ethylhexyl) phthalate, bis(2-propylheptyl) phthalate, diisononyl phthalate, di-n-butyl phthalate, butyl benzyl phthalate, diisodecyl phthalate, dioctyl phthalate, diisooctyl phthalate, diethyl phthalate, diisobutyl phthalate, di-n-hexyl phthalate, and other phthalate esters; adipate-based plasticizers based on bis(2-ethylhexyl) adipate, dimethyl adipate, monomethyl adipate, dioctyl adipate and the like; sebacate-based plasticizers; maleate-base plasticizers; trimellitate-based plasticizers such as tri-(2-ethylhexyl) trimellitate; azelates-based; benzoate-based; organophosphate-based; organophosphite-based; glycols; glycol ethers; glycol esters and diesters; methyl rincinoleate; epoxidized soybean oil; epoxidized vegetable oils; epoxidized esters of vegetable oils, and combinations thereof.

In another embodiment, the flexible cellular foam product or fabric product includes a coating layer including an extender selected from a group consisting of talc, calcium carbonate, barium sulfate, magnesium sulfate, carbon black, mica, titanium dioxide, microencapsulated phase change materials, and combinations thereof.

In another embodiment, the flexible cellular foam product or fabric product includes a coating layer including a stabilizer in an amount of up to about 5 wt %.

In another embodiment, the flexible cellular foam product or fabric product includes the flexible foam substrate selected from the group consisting of polyurethane flexible foam, latex flexible foam, and combinations thereof.

In another embodiment, the flexible cellular foam product or fabric product includes a surfactant in an amount between about 0.01 wt % independently and about 5 wt %. In this embodiment, the flexible cellular foam product or fabric product further includes a plasticizing agent selected from a group consisting of phthalate-based plasticizers comprising bis(2-ethylhexyl) phthalate, bis(2-propylheptyl) phthalate, diisononyl phthalate, di-n-butyl phthalate, butyl benzyl phthalate, diisodecyl phthalate, dioctyl phthalate, diisooctyl phthalate, diethyl phthalate, diisobutyl phthalate, di-n-hexyl phthalate, and other phthalate esters; adipate-based plasticizers based on bis(2-ethylhexyl) adipate, dimethyl adipate, monomethyl adipate, dioctyl adipate and the like; sebacate-based plasticizers; maleate-base plasticizers; trimellitate-based plasticizers such as tri-(2-ethylhexyl) trimellitate; azelates-based; benzoate-based; organophosphate-based; organophosphite-based; glycols; glycol ethers; glycol esters and diesters; methyl rincinoleate; epoxidized soybean oil; epoxidized vegetable oils; epoxidized esters of vegetable oils, vegetable oils, plant-based oils, natural oils, and combinations thereof. In this embodiment, the flexible cellular foam product or fabric product further includes an extender selected from a group consisting of talc, calcium carbonate, barium sulfate, magnesium sulfate, mica, titanium dioxide, phase change materials, and combinations thereof.

In another embodiment, an article selected from a mattress, topper, pillow, pillow topper, mattress topper, quilted topper, body support foam, pet beds, outdoor bedding pads, outdoor pillows, cushions, armrests, seat-backs, foot-rests, decorative cushioning, and functional support has a surface coated with a coating as described above.

In another embodiment, a product as described herein includes a substrate selected from a group consisting of a fabric, a slabstock foam, and a molded foam. The substrate has at least one surface. The product further includes a coating layer including a highly thermally conductive nanomaterial and a binder on at least one surface of the flexible foam substrate or fabric substrate. The binder binds the highly thermally conductive nanomaterial to the at least one surface of the flexible foam substrate or fabric substrate. The binder is selected from a group consisting of acrylic polymer emulsions produced from a monomer selected from a group consisting of ethyl acrylate, butyl acrylate, 2-ethylhexyl acrylate, methyl methacrylate, acrylic acid, methyl acrylate, and combinations thereof, polyvinylidene chloride latex, styrene-butadiene latex, carboxylated acrylonitrile butadiene rubber, carboxylated butadiene copolymer rubber, styrene-acrylic emulsion polymers including resin supported emulsions, vinyl-acetate based polymers such as vinyl acetate ethylene copolymers and vinyl acrylic latex, nitrile latex elastomers, nitrile-butadiene elastomers, polybutadiene elastomers produced from 1,3-butadiene elastomers, dicyclopentadiene-based elastomers, ethylene propylene dicyclopentadiene-based elastomers, neoprene binder, natural rubber binder, water-based polyurethane elastomers, starch/dextrin-based binders, protein/casein-based binders, silicone-based binders, and combinations thereof.

In another embodiment, the product includes a coating layer having between 0.0001 wt % and 50 wt % highly thermally conductive nanomaterials.

In another embodiment, the product includes highly thermally conductive nanomaterial is selected from a group consisting of single-walled carbon nanotubes, double-walled carbon nanotubes, multi-walled carbon nanotubes, graphite nanoplatelets, graphene nanoplatelets, graphite oxide, graphene oxide, diamond nanoparticles, carbonado nanoparticles, carbon nanodots, carbon nanofibers, carbon nanotips, carbon nanowhiskers, silicon carbide, boron nitride, boron carbide, and mixtures thereof.

In another embodiment, the product includes highly thermally conductive nanomaterial selected from a group consisting of aluminum, copper, iron, steel, silver, gold, platinum, nickel, tin, chromium, vanadium, tungsten, and combinations thereof, or derivatives made from any of those materials combined with oxygen, halogens, carbon, or silicon, and any combination thereof.

It will be appreciated that the various elements and details shown in photographic and graphic illustrations are not necessarily to scale or proportion, and that many details have been removed or simplified for clarity. Furthermore, this disclosure is not necessarily limited to the embodiments or details depicted or discussed in the Figures.

DETAILED DESCRIPTION

A coating including highly thermally conductive nanoparticles (HTCN) applied to a surface of a foam substrate or fabric improves thermal dissipation properties of the foam substrate or fabric. The coating layer is produced from a mixture containing HTCN, a solvent, and a binder. The binder may be a solid adhesive agent, an aqueous solvent, an emulsion, or combinations thereof. The coating layer can also comprise optional plasticizing agents, optional salts, optional extenders or pigments, antimicrobial agents, optional stabilizers, and other optional active and/or inactive materials. In all embodiments referring to "flexible cellular foam", slabstock foam and molded foam may be substituted for "flexible cellular foam" and such embodiments are still considered within the inventive conception described herein.

It has been discovered that covering a surface of a foam substrate or fabric substrate with a coating layer including highly thermally conductive nanoparticles increases the density of the highly thermally conductive nanoparticles and increases particle-to-particle contact compared to foam substrates or fabrics including highly thermally conductive nanoparticles interposed within the body of a foam substrate or fabric. This increase in density and particle-to-particle contact of highly thermally conductive nanoparticles increases lateral heat transfer of thermal energy from areas on the surface of the foam substrate or fabric from relatively high thermal energy areas of the foam substrate or fabric to relatively low thermal energy areas of the foam substrate or fabric. Moreover, because a coating layer including highly thermally conductive nanomaterials is present at a surface of the foam substrate or fabric, heat transfer occurs on the surface of the foam substrate or fabric, and prevents much of the heat from pooling inside the foam substrate or fabric. If heat were to pool inside the foam substrate or fabric, the user of the foam substrate or fabric would feel hotter compared to a user of a foam substrate or fabric coated with highly thermally conductive nanomaterials. By keeping thermal energy closer to the surface and dissipating thermal energy out over a wide surface area, the cooling effect is experienced by the user. Accordingly, fewer highly thermally conductive nanomaterials are needed to coat or cover a surface of a foam substrate or fabric to achieve similar energy dissipation performance, decreasing the overall weight of a foam substrate or fabric coated on a surface with highly thermally conductive nanomaterials compared to a foam substrate or fabric including highly thermally conductive nanomaterials dispersed within the foam substrate or fabric.

As used herein, "nano-sized" is defined to mean that the particle length in at least one dimension is less than 1,000 nanometers, such as between 1 nm and 1,000 nm, preferably between about 1 and about 500 nanometers. HTCN have a high thermal conductivity of greater than about 5 W/(m-K), preferably at least 10 W/(m-K), and up to about 25,000 W/(m-K). Additional types of HTCN or high thermally conductive solids (HTCS) may be added when forming the coating in addition to the HTCN particles. For example, metal highly thermally conductive solids may also be used in methods and products described herein and may be selected from a non-limiting list of aluminum, copper, iron, steel, silver, gold, platinum, nickel, tin, chromium, vanadium, tungsten, and combinations thereof, or derivatives made from any of those materials combined with oxygen, halogens, carbon, or silicon, and any combination thereof. The metal material may be flakes, powders, crystalline arrangements, particulates, and combinations thereof. Alternatively or in addition, the HTCN particles may be accompanied by other materials having a size larger than 1000 nanometers, such as graphite, graphene, silicon carbide, boron carbide, boron nitride, or combinations thereof, preferably having a size between 1 micron and 1000 microns. Alternatively or in addition, the highly thermally conductive nanomaterials may be accompanied by phase change materials ("PCM") or other materials with high heat capacities.

In embodiments of the invention in which PCM are used, the PCM are microencapsulated to include the PCM inside a microencapsulation of polymer or polymeric coating.

Table 1 shows a non-limiting list of phase change materials that can be microencapsulated to be incorporated into the coating and/or coating layer. The non-limiting list of phase change materials in Table 1 is for example purposes. Preferably, suitable phase change materials have a solid/liquid phase transition temperature from −10° F. to 220° F. (about −23° C. to about 104° C.). More preferably, the phase change solid/liquid phase transition temperature is from 68° F. to 95° F. (about 20° C. to about 35° C.). The phase change material can be classified as having non-polar characteristics such as n-hexadecane and n-octadecane, polar characteristics such as polyethylene glycol-based polymers and beeswax, and ionic characteristics such as $CaCl_2 \cdot 6H_2O$ and $Na_2SO_4 \cdot 10H_2O$.

Microencapsulated phase change materials can be encapsulated by polymeric coatings such as, but not limited to, acrylic, melamine-formaldehyde, urea-formaldehyde coatings and the like. The outside polymeric coating is selected to retain the phase change material for the freeze-thaw cycles and end use. "Microencapsulated" is defined herein as particles having an average particle size of from about 0.1 independently to about 1000 microns, alternatively from about 1 independently to about 100 microns.

TABLE 1

PHASE CHANGE MATERIALS PROPERTIES

| Phase Change Material | Transition Temperature °F. | Transition Temperature °C. | Latent Heat Btu/lb | Notes |
|---|---|---|---|---|
| Polyethylene glycol 600 | 68-77 | 20-25 | 63 | Non-paraffin organic |
| camphene | 50 | 10 | 102 | Non-paraffin organic |
| Oxazoline wax | 122 | 50 | | Non-paraffin organic |
| d-lactic acid | 79 | 26.1 | 79 | Non-paraffin organic |
| Formic acid | 47 | 8.3 | 118 | Organic |
| Acrylic acid | 54 | 12.2 | 66.7 | Organic |
| p-xylene | 56 | 13.3 | 68.1 | Organic |
| Caprylic acid | 61 | 16.1 | 63.7 | Organic |
| Jojoba wax | 52-53.2 | 11.2-11.8 | | Insoluble fatty of natural oils and waxes |
| Cotton seed oil | 94.1 | 34.5 | | Insoluble fatty of natural oils and waxes |
| Coconut | 77 | 25 | | Insoluble fatty of natural oils and waxes |
| Almond | 56.3 | 13.5 | | Insoluble fatty of natural oils and waxes |
| Beechnut | 74.3 | 23.5 | | Insoluble fatty of natural oils and waxes |
| Black mustard | 61.7 | 16.5 | | Insoluble fatty of natural oils and waxes |
| Candlenut | 68.9 | 20.5 | | Insoluble fatty of natural oils and waxes |
| Castor oil | 55.4 | 13 | | Insoluble fatty of natural oils and waxes |
| Corn oil | 65.3 | 18.5 | | Insoluble fatty of natural oils and waxes |
| Cotton seed sterain | 83.3 | 28.5 | | Insoluble fatty of natural oils and waxes |
| Esparto | 63.5 | 17.5 | | Insoluble fatty of natural oils and waxes |
| Poppy seed | 68.9 | 20.5 | | Insoluble fatty of natural oils and waxes |
| Rape seed (canola) | 66.2 | 19 | | Insoluble fatty of natural oils and waxes |
| Pumpkin seed | 136.4 | 58 | | Insoluble fatty of natural oils and waxes |
| Soy bean | 80.6 | 27 | | Insoluble fatty of natural oils and waxes |
| Sunflower | 73.4 | 23 | | Insoluble fatty of natural oils and waxes |
| Walnut | 57.74 | 14.3 | | Insoluble fatty of natural oils and waxes |
| White mustard seed | 59.9 | 15.5 | | Insoluble fatty of natural oils and waxes |
| Beeswax | 143 | 62 | 76 | Insoluble fatty of natural oils and waxes |
| $NH_4Cl$ $Na_2SO_4 \cdot 10H_2O$ | 52 | 11.1 | 70 | Hydration-dehydration reaction |
| NaCl NH4Cl $2Na_2SO_4 \cdot 20H_2O$ | 55 | 12.8 | 78 | Hydration-dehydration reaction |
| NaCl $Na_2SO_4 \cdot 10H_2O$ | 65 | 18.3 | 80 | Hydration-dehydration reaction |
| n-tetradecane | 41.9 | 5.5 | 98 | Hydrocarbon paraffins |
| n-pentadecane | 50 | 10 | 88 | Hydrocarbon paraffins |
| n-hexadecane | 62.1 | 16.7 | 102 | Hydrocarbon paraffins |
| n-heptadecane | 71.1 | 21.7 | 92 | Hydrocarbon paraffins |
| n-octadecane | 82.4 | 28 | 105 | Hydrocarbon paraffins |
| n-nonadecane | 89.6 | 32 | | Hydrocarbon paraffins |
| n-eicosane | 98.1 | 36.7 | 106 | Hydrocarbon paraffins |
| n-heneicosane | 104.4 | 40.2 | 86 | Hydrocarbon paraffins |
| n-decosane | 111.2 | 44 | 107 | Hydrocarbon paraffins |
| n-tricosane | 117.5 | 47.5 | 100 | Hydrocarbon paraffins |
| Trimethylolethane | 178 | 81 | | Mesocrystalline phase change |
| C-16 to C-22 alkyl hydrocarbons | 50-122 | 10-50 | >50 | Alkyl hydrocarbons |
| Natural rubber | Varies to 77 | Varies to 25 | | Crystalline Phase change |

TABLE 1-continued

PHASE CHANGE MATERIALS PROPERTIES

| Phase Change Material | Transition Temperature °F. | °C. | Latent Heat Btu/lb | Notes |
|---|---|---|---|---|
| Polychloropropene | 89.6 | 32 | >54 | |
| Witco 45A | 87.8 | 31 | >54 | Crystalline alkyl hydrocarbons |
| Witco K-61 | 75.2 | 24 | >54 | Crystalline alkyl hydrocarbons |
| Witco K-51 | 62.6 | 17 | >54 | Crystalline alkyl hydrocarbons |
| Witco 85010-1 | 44.6 | 7 | >54 | Crystalline alkyl hydrocarbons |
| Pentaeythritol | Plastic crystals (no change of state but release high amounts of E before melting) | | | |
| Polyhydric alcohols | Plastic crystals (no change of state but release high amounts of E before melting) | | | |
| Acrylate and methacrylate polymers | 0 | −17.78 | | With C-16 to C-18 alkyl side chains |
| $CaBr_2 \cdot 6H_2O$/NaCl | 59 | 15 | | Hydration-dehydration reaction |
| $NaSO_4 \cdot 10H_2O$/NaCl | 64 | 17.78 | | Hydration-dehydration reaction |
| $CaCl_2 \cdot 6H_2O$ | 82 | 27.78 | | Hydration-dehydration reaction |
| $Na_2SO_4 \cdot 10H_2O$ | 90 | 32.22 | | Hydration-dehydration reaction |
| $CaBr_2 \cdot 6H_2O$ | 93 | 33.89 | | Hydration-dehydration reaction |

All ranges or values of properties of the embodiments described herein include the endpoints of the ranges specified. The methods taught herein of using a highly thermally-conductive nanomaterial (HTCN) in a coating applied to a flexible cellular foam substrates or fabrics are useful in improving heat dissipation in articles such as, but not limited to, mattresses, mattress toppers, pillows, bedding products, pet beds, quilted mattress toppers, pillow or mattress inserts, contoured support foam, or other cushioning products.

Flexible cellular foams may include, but are not limited to, open-celled polyether polyurethane foam, closed-celled polyether polyurethane foam, partially open-celled polyether polyurethane foam, open-celled polyester polyurethane foam, closed-cell polyester polyurethane foam, partially open-celled polyester polyurethane foam, natural or synthetic latex foam, and combinations thereof. In non-limiting example, a synthetic latex foam may include a neoprene-based latex foam.

Fabrics may also be used as a substrate for the HTCN coating. Examples of fabrics include, but are not limited to, fabrics made from woven and non-woven fibers, mattress covers, pillowcases, bedding, or comfort materials Highly thermally-conductive nanomaterials (HTCN) are included in a coating to be applied to flexible cellular foam polymer matrix or fabric fibers to form a product, and the product may be used in bedding and seating articles. Heat, such as the heat generated by a person sleeping on a mattress, in regions of the surface of the product that are warmer than other regions, dissipates to a cooler region through improved conduction and convection, as compared to other types of coatings, additives, or substrates without a coating layer according to this invention. The coating layer including HTCN applied to a substrate surface including flexible cellular foam substrate or fabric to form a product increases the thermal conductivity of the product and allows heat to transfer at a faster rate across a surface of the product from warmer regions to cooler regions of the surface of the product. Alternatively, the HTCN may be mixed in a slurry to form a coating and coated in a coating layer, in the weight percentages provided herein, onto one or more surfaces of a flexible cellular foam substrate to form a flexible cellular foam product or applied to fabrics to form a fabric composition. All embodiments described herein may include the highly thermally-conductive nanomaterials dispersed in a coating and coated in a coating layer on one or more surfaces of a flexible cellular foam substrate or fabric without chemically bonding, ionically or covalently, the highly thermally-conductive nanomaterials to the flexible cellular foam substrate or fabric. In some examples, the binder mechanically binds the highly thermally-conductive nanomaterials to the flexible foam substrate. The coatings and/or coating layers described herein may be used in a myriad of applications such as, but not limited to, bedding articles, mattresses, or electronics. In addition, all embodiments described herein may include highly thermally-conductive nanomaterials which do not include polymer-bonding moieties.

The highly thermally-conductive nanomaterials (HTCN) may include, but not limited to, a group of carbon-containing nanomaterials. In some examples, the carbon-containing nanomaterials may be selected from a group consisting of single-walled carbon nanotubes, double-walled carbon nanotubes, multi-walled carbon nanotubes, graphite nanoplatelets, graphene nanoplatelets, graphite oxide, graphene oxide, diamond nanoparticles, carbonado nanoparticles, carbon nanodots, carbon nanofibers, carbon nanotips, carbon nanowhiskers, silicon carbide, boron nitride, boron carbide, and mixtures thereof. Regardless of whether the HTCN particles include carbon-containing nanomaterials, in the coating layer, HTCN is present in an amount between about 0.0001 wt % and 99.99 wt % of the coating layer, preferably between about 0.0001 wt % and about 50.0 wt %, based on the product weight after solvent loss. In one non-limiting embodiment, the HTCN is present in the coating layer in an amount between about 0.0005 wt % and about 15.0 wt %, based on the product weight after solvent loss. Alternatively or in addition, the HTCN included in the coating layer can be between 0.0001 wt % and 99.99 wt %, preferably between 0.001% and 85%, and more preferably between 0.01 wt % and 70 wt %.

The HTCN may suitably be a powder having an average particle size between about 1 nanometer and about 1000 nanometers, alternatively, between about 1 nanometer and about 500 nanometers. Nano-sized particles, such as crystals, powders, dots, rods, horns, fibers, wires, whiskers, stars, and ribbons, may also be used.

When the coating layer is applied to the flexible cellular foam substrate or fabric, sometimes referred to as the "wet state", the coating layer includes a solvent. During a curing process, the solvent will evaporate and no longer be present in the coating layer. However, prior to curing, the solvent is present in the coating layer. The solvent carries the materials included in the coating to facilitate the coating to be spread over a surface of the flexible cellular foam substrate or fabric to form the coating layer. Suitable aqueous solvents include water per se or water-based emulsions. In a preferred embodiment, the solvent is water per se. Aqueous solvents are preferred due to their decreased odor, decreased hazard risks to both the workers handling the solvent and to the environment, and decreased cost when compared to organic solvents.

Aqueous solvents used herein are used in combination with a polymer compatible with aqueous solvents. Examples of suitable polymers are selected from a group consisting of acrylic polymer emulsions produced from ethyl acrylate, butyl acrylate, 2-ethylhexyl acrylate, methyl methacrylate, acrylic acid, methyl acrylate, polyvinylidene chloride latex, styrene-butadiene latex, carboxylated acrylonitrile butadiene rubber, carboxylated butadiene copolymer rubber, styrene-acrylic emulsion polymers including resin supported emulsions, vinyl-acetate based polymers such as vinyl acetate ethylene copolymers and vinyl acrylic latex, nitrile latex elastomers, nitrile-butadiene elastomers, polybutadiene elastomers produced from 1,3-butadiene elastomers, dicyclopentadiene-based elastomers, ethylene propylene dicyclopentadiene-based elastomers, neoprene binder, natural rubber binder, water-based polyurethane elastomers, starch/dextrin-based binders, protein/casein-based binders, silicone-based binders, and combinations thereof.

The coating layer further includes a binder. The binder mechanically binds the materials included in the coating layer to the surface of the flexible cellular foam substrate or fabric onto which the coating is applied to form the coating layer. The specific binders will vary with the particular embodiments, however binders used herein are compatible with aqueous solvents. For instance, for the coating including an aqueous solvent, the binder may be a water-based emulsion binder, such as a latex paint, water-based polyurethane, or glue. Suitable water-based emulsion binders include, but are not necessarily limited to, acrylic polymer emulsions, styrene-butadiene latex, styrene-acrylic emulsion polymers including resin supported emulsions, vinyl-acetate based polymers such as vinyl acetate ethylene copolymers and vinyl acrylic latex, nitrile elastomers, natural latex, water-based polyurethane, and combinations thereof.

The proportion of binders in the product that forms the HTCN coating applied to the flexible cellular foam substrate or fabric may range from about 0.01 wt % independently to about 99.99 wt %; alternatively from about 0.1 wt % independently to about 99.9 wt %, alternatively from about 1 wt % independently to about 80 wt %.

The coating may further include an optional surfactant. The surfactant improves the wettability of the product on the flexible cellular foam substrate or fabric, and improves the stability of the emulsion. Suitable surfactants include, but are not necessarily limited to, anionic, non-ionic, cationic, polymeric, or electrosteric surfactants. In one non-limiting embodiment a suitable proportion of a surfactant in the coating layer including an aqueous solvent range from 0.01 wt % independently to about 5 wt %; alternatively from about 0.5 wt % independently to about 3 wt %.

The coating layer including highly thermally-conductive nanomaterials may also contain useful amounts of additives ("property-enhancing additives") such as a surfactant, a plasticizing agent, a salt, a pH adjuster, an extender, a pigment, a stabilizer, a flame retardant, or combinations thereof. Alternative or additional property-enhancing additives may include antioxidants, antistatic agents, antimicrobial agents, ultraviolet stabilizers, additional phase change materials, surface tension modifiers, solid flame retardants, liquid flame retardants, grafting polyols, compatible hydroxyl-containing chemicals, solid or liquid fillers, anti-blocking agents, colorants, reactive organic colorants or dyes, heat-responsive colorants, heat-responsive pigments, heat-responsive dyes, pH-responsive colorants, pH-responsive pigments, pH-responsive dyes, fragrances, viscosity-modifiers, thermally conductive-enhancing additives, and other polymers in minor amounts and the like to an extent not affecting or substantially decreasing the desired properties of the coating layer with highly thermally-conductive nanomaterials. Particularly, examples of the suitable flame retardants are expandable graphite, aluminum trihydrate (ATH), magnesium hydroxide (MDH), organophosphates, melamine, and combinations thereof. In some examples, the surface tension modifiers are silicone surfactants, emulsifying agents, and/or other surfactants. In some examples, the compatible hydroxyl-containing chemicals are completely saturated or unsaturated in one or more sites. In some examples, the colorants are inorganic pigments, carbon black pigments, organic colorants or dyes. In some embodiments, the viscosity modifiers are fumed silica and clays. In some embodiments, the thermally conductive-enhancing additives are copper, titanium, aluminum, silver, gold, tungsten, graphite, graphene, silicon carbide, boron carbide, boron nitride, diamond, titanium, and combinations thereof.

The coating layer may include a plasticizing agent. Optional plasticizing agents are not absolutely necessary for the coating layers, but they can make the coating layer more flexible in the cases of the water- and solvent-based coatings. Suitable plasticizing agents include, but are not necessarily limited to, phthalate-based plasticizers comprising bis(2-ethylhexyl) phthalate, bis(2-propylheptyl) phthalate, diisononyl phthalate, di-n-butyl phthalate, butyl benzyl phthalate, diisodecyl phthalate, dioctyl phthalate, diisooctyl phthalate, diethyl phthalate, diisobutyl phthalate, di-n-hexyl phthalate, and other phthalate esters; adipate-based plasticizers based on bis(2-ethylhexyl) adipate, dimethyl adipate, monomethyl adipate, dioctyl adipate and the like; sebacate-based plasticizers; maleate-base plasticizers; trimellitate-based plasticizers such as tri-(2-ethylhexyl) trimellitate; azelates-based; benzoate-based; organophosphate-based; glycols; glycol ethers; glycol esters and diesters; methyl rincinoleate; epoxidized soybean oil; epoxidized vegetable oils; epoxidized esters of vegetable oils; and combinations thereof. In particular, suitable plasticizing agents for water-based coatings are eastman benzoflex 50™, eastman benzoflex 9-88™, eastman benzoflex 9-88Sg™, eastman benzoflex 1046™, eastman Effusion™, eastman Dom™, eastman optifilm enhancer 400™, eastman Triacetin™, eastman Txib™, eastman velate 262™, eastman velate 368™, eastman velate 375™, and combinations thereof. The eastman products are manufactured by Eastman Chemical Company™, headquartered in Kingsport, TN.

The coating may include a salt and/or pH adjuster. In one non-limiting embodiment a suitable proportion range for the optional salts or pH adjusters is from 0% independently to about 2 wt %; alternatively from about 0.1 wt % independently to about 1 wt %. The coating may include pH adjusters consisting of monoprotic acids and bases, polyprotic acids and bases, and combinations thereof. The pH adjusters may be based on inorganic compounds, organic compounds, and combinations thereof. In one non-limiting embodiment a suitable proportion range for the optional pH adjusters is from 0% independently to about 10 wt %; alternatively from about 0.1 wt % independently to about 1 wt %. In one non-limiting embodiment, the pH adjuster includes a weak acid-base conjugate pair. The pH adjuster is added in a sufficient quantity to maintain the HTCN coating pH within a desired pH range during its shelf storage life and curing stages especially if property-enhancing additives are prone to release acidic or basic components during its useful life. In particular, suitable pH buffering agents (typical useful pH range) include, but are not necessarily limited to, citric acid (2.1-7.4), acetic acid (3.8-5.8), bicarbonates (5.1-7.1), monopotassium phosphate (6.2-8.2), N-Cyclohexyl-2-aminoethanesulfonic acid (8.3-10.3), and borates (8.25-10.25).

The coating layer may include an extender and/or pigment. An extender can be used as an inert filler for cost savings or to improve certain coating properties such as tackiness, color, or other property. Optional extenders may include, but are not necessarily limited to, an extender selected from a group consisting of talc, calcium carbonate, barium sulfate, magnesium sulfate, carbon black, mica, titanium dioxide, phase change materials, and combinations thereof. In one non-limiting embodiment, the proportion of optional, additional extenders in the HTCN coating range from 0 independently to 90 wt %; alternatively from 0.5 wt % independently to 70 wt %.

The coating layer in the liquid form may include a stabilizer. The stabilizer can refer to, as each are described above, a surfactant, a salt and/or pH adjuster, a dispersing agent (for example, a material that improves the dispersion of the solid or emulsified particles in the coating), a thickening agent (for example, a material that acts to adjust the viscosity of the coating), a catalyst (for example, a substance that increases the cross-linking or chemical adhesive ability of the coating to other coating particles), other such material used to adjust the chemical or physical properties of the mixture, and combinations thereof. In one non-limiting embodiment a suitable proportion range for the optional stabilizers is from 0% independently to about 5 wt %; alternatively from about 0.5 wt % independently to about 3 wt %.

One suitable, specific embodiment of the non-limiting embodiment using a water-based coating layer includes a water-based emulsion binder (e.g. a latex paint or glue) that contains HTCN. The coating layer also contains a plasticizer to improve the flexibility of the coating layer, a surfactant to improve the wettability of the coating layer on the flexible cellular foam substrate or fabric and the stability of the liquid product (which forms an emulsion between the water and added plasticizer), and an antimicrobial package for product longevity. Nevertheless, the broader concept includes HTCN applied to the surface of flexible cellular foam substrate or fabric as a post-treatment and adhered in some manner to improve thermal energy dispersion properties, not only the specific product previously just mentioned.

In an embodiment, the coating layer may be present on a surface of the flexible cellular foam substrate or fabric in a height of between 0.01 mm independently and 10 mm. In an embodiment, the coating layer may be present on a surface of the flexible cellular foam substrate or fabric in a thickness of between 10-25,000 g/m$^2$, preferably 10-2000 g/m$^2$, inclusively. As used herein, the term "thickness" refers to grams of coating per square meter of a surface of a substrate onto which the coating layer is present. In an embodiment, the HTCN particles included in the coating layer may have an average particle size between about 1 nm to about 1,000 nm.

The coating layer may be applied to the flexible cellular foam substrate or fabric by a variety of methods, and each of these methods are post-treatment. Post-treatment is intended to indicate that the coating layer is applied after the flexible cellular foam substrate or fabric is formed, rather than in-situ during formation of the flexible cellular foam substrate or fabric. The methods of application of the coating to form the coating layer on the flexible cellular foam substrate or fabric include, but are not necessarily limited to:

coating at least one surface of the flexible cellular foam substrate or fabric with the HTCN coating;

spraying the HTCN coating onto the at least one surface of the flexible cellular foam substrate or fabric;

applying the HTCN coating to the surface of a mold in which the flexible cellular foam substrate is formed or fabric is housed within, although it should be understood that the HTCN coating may be applied to any surface to which a flexible cellular foam substrate or fabric is subsequently contacted or formed upon;

applying the HTCN coating onto a first surface and pouring flexible cellular foam substrate-forming components onto the surface or applying fabric threads onto the surface, where the first surface could be a film or mold, where optionally the first surface, film, or mold transfers the HTCN coating onto a surface of the flexible cellular foam or fabric substrate by melt transfer;

introducing the flexible cellular foam substrate or fabric into a reservoir of HTCN coating material, including, but not necessarily limited to dipping or soaking the flexible cellular foam substrate or fabric into a pool of HTCN coating material;

gluing HTCN onto the at least one surface of the flexible cellular foam substrate or fabric;

applying solid HTCN to the at least one surface of the flexible cellular foam substrate or fabric and subsequently applying an adhesive, such as a binder, to the solid HTCN in an amount effective to adhere the HTCN to the at least one surface of the flexible cellular foam substrate or fabric;

frothing a mixture comprising HTCN and subsequently applying the mixture to the at least one surface of the flexible cellular foam substrate or fabric employing a kiss-roll method;

applying a pre-made mixture of an elastomer binder comprising HTCN and a component selected from the group consisting of polyurethane, latex, polyethylene, polyurea, and combinations thereof to the at least one surface of the flexible cellular foam substrate or fabric and subsequently curing the mixture;

adhering a layer of flexible cellular foam having HTCN distributed throughout to the at least one surface of a flexible cellular foam substrate or fabric, the coating layer of flexible cellular foam substrate may have a relatively high level of HTCN therein compared to the flexible cellular foam substrate or fabric, itself;

applying a composition comprising neoprene and HTCN to the at least one surface of the flexible cellular foam substrate or fabric with a doctor blade or other tool;

spraying or roll coating the HTCN coating onto the flexible cellular foam substrate surface or fabric;

spraying the HTCN coating onto the at least one surface of a flexible cellular foam substrate or fabric and felting the coating with pressure and heat, similar to processes for spraying cellulose insulation;

applying the HTCN coating to the at least one surface of the flexible cellular foam substrate or fabric in a thermoplastic coating;

applying the HTCN coating to the at least one surface of the flexible cellular foam substrate or fabric where the HTCN coating additionally comprises at least one crosslinked elastomer; and applying a fabric including a coating layer to the flexible cellular foam body substrate or fabric.

EXAMPLES

Testing Methods

In the following Examples, as illustrated by the data in the following tables, the following tests have been used:
Thermal Effusivity (TE): Tested According to ASTM Test D7984-16

This is a standard test method for thermal effusivity of solids using a modified transient plane source instrument. This test method measures the rate of thermal transport between a heating element and a fabric specimen. Some of the comfort properties of a garment relate to initial thermal sensations (that is, cold or warm feeling upon initial contact), where lower thermal effusivity values indicate sensations of warmth and higher values indicate sensations of coolness. The thermal effusivity of different fabrics and their initial perceived surface temperature are important to assist product developers with fabric selection.

Table 2 tabulates the physical properties of flexible cellular foam substrate or fabric coated with HTCN coatings according to the invention described herein ("Graphene Nanoplatelet Coating" or Carbon Nanotube Coating") versus foam substrates or fabrics coated with comparative example coatings or uncoated foam substrates or fabrics. The comparative example coatings include uncoated foam substrates or fabrics, which is foam substrates or fabrics without coating. The comparative example coatings also include "standard coating", which is the foam substrate or fabric coated with coatings not including HTCN particles according to the invention described herein. The "standard coatings" include all of the same materials as the other coatings except for the HTCN particles. The comparative example coatings also include "Graphite coating" which are foams coated with a graphite coating. In some comparative examples, micro-sized particles are used rather than nano-sized, as in examples having a non-zero amount of "HTC Micro %." The micro-sized particles have particle sizes greater than nano-sized. The amounts and sizes of the HTCN particles included in each coating tested is shown in Table 2. Table 2 further includes, where applicable, the average thermally conductive particle size of thermally conductive particles included in the respective coatings in the Notes column. An increase in performance is shown when the size of these particles is reduced to nano-sized particles in the coating, as per the invention described herein. Each of the products tested and shown in Table 2 were tested using standard ASTM D7984-16 Thermal Effusivity.

TABLE 2

Performance of Coating and Comparative Examples

| Product Description | Substrate | HTC Nano (%) | HTC Micro (%) | Coating Thickness (g/m$^2$) | Thermal Effusivity (Ws$^{1/2}$/m2-K) | Thermal Conductivity (W/m-K) | Thermal Effusivity Percent Improvement Compared to Standard Coating | Thermal Conductivity Percent Improvement Compared to Standard Coating | Notes |
|---|---|---|---|---|---|---|---|---|---|
| Uncoated Control | Visco Foam | 0 | 0 | 0 | 132 | 0.053 | 0% | 0% | |
| Standard Coating | Visco Foam | 0 | 0 | 310 | 265 | 0.099 | 0% | 0% | Control, comparative 1 |
| Graphite Coating | Visco Foam | 0 | 1 | 310 | 255 | 0.094 | −4% | −5% | Comparative 2, Avg. particle size ~300 microns |
| Graphite Coating | Visco Foam | 0 | 8 | 310 | 275 | 0.101 | 4% | 2% | Comparative 2 with higher level of additive Avg. particle size ~300 microns |
| Graphene Nanoplatelet Coating | Visco Foam | 1 | 0 | 310 | 288 | 0.132 | 9% | 33% | Substantial thermal conductivity improvement at only 1% Avg. particle size between 1 nm-1000 nm |
| Graphene Nanoplatelet Coating | Visco Foam | 8 | 0 | 310 | 305 | 0.151 | 15% | 53% | Avg. particle size between 1 nm-1000 nm |
| Carbon Nanotube Coating | Visco Foam | 1 | 0 | 310 | 400 | 0.125 | 51% | 26% | Substantial thermal conductivity improvement at only 1% Avg. particle size between 1 nm-1000 nm |
| Standard Coating | Fabric | 0 | 0 | 201 | 243 | 0.0959 | 0% | 0% | |
| Graphite Coating | Fabric | 0 | 8 | 201 | 255 | 0.0987 | 5% | 3% | Avg. particle size ~300 microns |
| Graphene Nanoplatelet Coating | Fabric | 8 | 0 | 201 | 287 | 0.1128 | 18% | 18% | Avg. particle size between 1 nm-1000 nm |
| Carbon Nanotube Coating | Fabric | 1 | 7 | 201 | 297 | 0.1221 | 22% | 27% | Avg. particle size between 1 nm-1000 nm |
| Standard Coating | Latex foam | 0 | 0 | 310 | 500 | 0.403 | 0% | 0% | |

TABLE 2-continued

Performance of Coating and Comparative Examples

| Product Description | Substrate | HTC Nano (%) | HTC Micro (%) | Coating Thickness (g/m²) | Thermal Effusivity (Ws$^{1/2}$/m2-K) | Thermal Conductivity (W/m-K) | Thermal Effusivity Percent Improvement Compared to Standard Coating | Thermal Conductivity Percent Improvement Compared to Standard Coating | Notes |
|---|---|---|---|---|---|---|---|---|---|
| Graphite Coating | Latex foam | 0 | 8 | 310 | 525 | 0.413 | 5% | 2% | Avg. particle size ~300 microns |
| Graphene Nanoplatelet Coating | Latex foam | 8 | 0 | 310 | 685 | 0.485 | 37% | 20% | Avg. particle size between 1 nm-1000 nm |
| Carbon Nanotube Coating | Latex foam | 1 | 0 | 310 | 545 | 0.447 | 9% | 11% | Avg. particle size between 1 nm-1000 nm |

As shown in Table 2, the thermal effusivity of the flexible cellular foam substrate or fabric coated with a coating layer according to the invention shows a higher thermal effusivity and conductivity compared to the comparative examples. This is true regardless of the type of flexible cellular foam substrate or fabric onto which the coating layer is applied. It is further shown that smaller amounts of conductive additive content included in the coating layers according to the invention is needed to achieve similar, though even still slightly superior, thermal effusivity and conductivity. For example, comparing the graphite coating (comparative example 2) to the graphene nanoplatelet coating (one of the inventive examples), there is an increase in thermal effusivity and conductivity from the 8% graphite coating to the 1% graphene nanoplatelet coating, and accordingly fewer thermally conductive material is needed in the inventive examples to achieve increased performance. This increase in performance is only increased with the increase in thermally conductive materials in the inventive examples. In sum, the results show substantial improvement in thermal effusivity and conductivity by incorporating HTCN coating on the flexible cellular foam substrates. As appears in Table 2, or elsewhere herein, the term "Visco" means viscoelastic foam, otherwise known as memory foam. The term "latex" means latex foams.

Applications of the Flexible Cellular Foams with Highly Thermally-Conductive Nanomaterial Coatings Unless stated otherwise, all of the applications described herein of a coating including highly thermally conductive nanomaterials being applied to a surface of a flexible cellular foam substrate can be likewise applied to a surface of a fabric.

As mentioned above, flexible cellular foam products or fabric products including a coating layer including highly thermally-conductive nanomaterials may be manufactured and combined with other substrate foams or fabrics for use in a variety of bedding articles, including but not necessarily limited to, mattresses, toppers, pillows, pillow toppers, mattress toppers, quilted toppers, other bed-top products, body support foam, pet beds, outdoor bedding pads, outdoor pillows, cushions, armrests, seat-backs, foot-rests, decorative cushioning, functional support, or other cushioning materials.

Layering substrates in combination with one or more flexible cellular foam substrates or fabrics coated with highly thermally-conductive nanomaterial coatings to form a coating layer and optional property-enhancing materials described herein may find utility in a very wide variety of applications. Suitable layering substrates include, but are not limited to, flexible polyurethane foam, flexible polyester polyurethane foam, latex foam, flexible melamine foam, and other substrates (such as fibers in woven or non-woven form), and combinations thereof. More specifically, in other non-limiting embodiments, the combination of flexible cellular foam substrates or fabrics coated with a highly thermally-conductive nanomaterial coating layer to form a product would be suitable as pillows or pillow components, including, but not necessarily limited to, pillow wraps or shells, pillow cores, pillow toppers, for the production of medical comfort pads, medical mattresses and similar comfort and support products, and residential/consumer mattresses, mattress toppers, pet beds, outdoor bedding pads, outdoor pillows, shoe insoles and inserts, sports and game cushioning, other cushioning products, and similar comfort and support products, typically produced with conventional flexible polyurethane foam or fiber or latex foam, for example. All of these uses and applications are defined herein as "bedding products" or "cushioning products."

Figure 1:
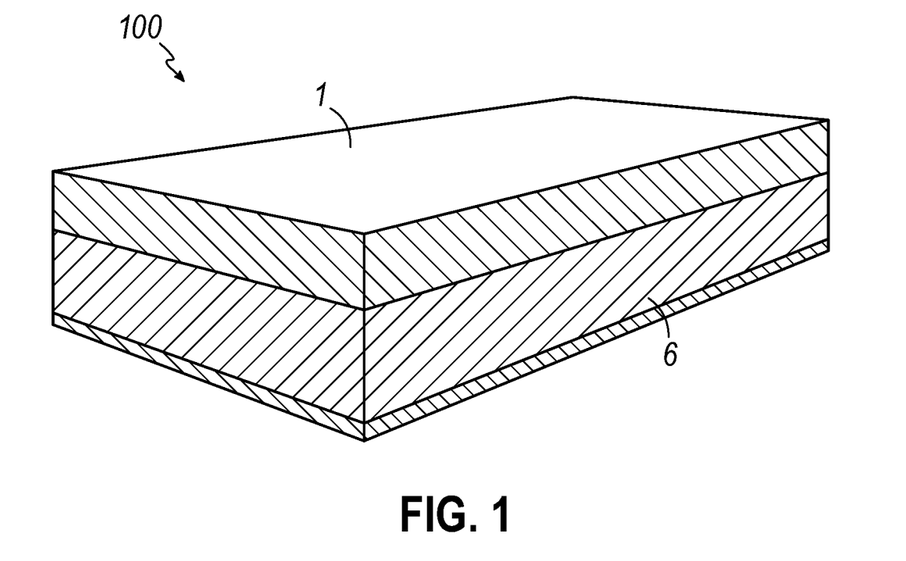
FIG. 1 is a perspective view of a bedding or seating product having a top comfort layer typically made of high density foam, such as memory foam.

In FIG. 1, an article 100 includes a flexible cellular foam product or fabric product 1 that acts as a top comfort layer of a mattress, which said comfort layer is made out of, but not limited to, memory foam, latex foam, soft polyurethane foams. The article 100 has a core support portion 6, which can also be made of, but not limited to, foam, springs or air core. The article 100 shown in FIG. 1 is an example of a conventional memory foam mattress, but the invention is not limited to such articles.

Figure 2:
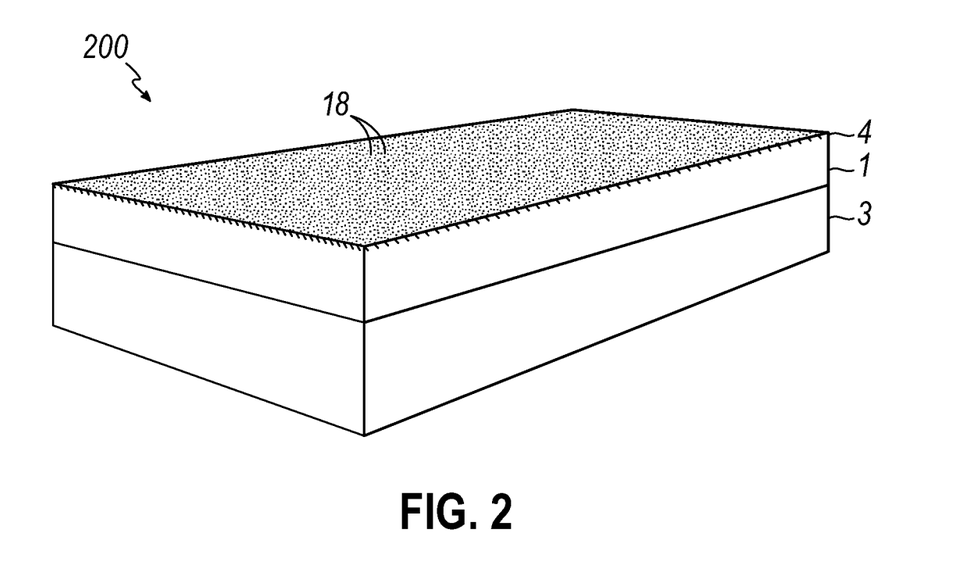
FIG. 2 is a perspective view of a bedding or seating product made with a top comfort layer which is coated with thermally conductive nanomaterial coating on a surface of the comfort layer.

In FIG. 2, an article 200 includes a flexible cellular foam product or fabric product 1 including a flexible cellular foam substrate or fabric having one or more surfaces coated with a highly thermally-conductive nanomaterial coating layer 4 including highly thermally conductive nanomaterials 18 to increase the thermal effusivity and/or conductivity of the mattress top layer. A prime foam layer 3 are used in this non-limiting embodiment.

Figure 3:
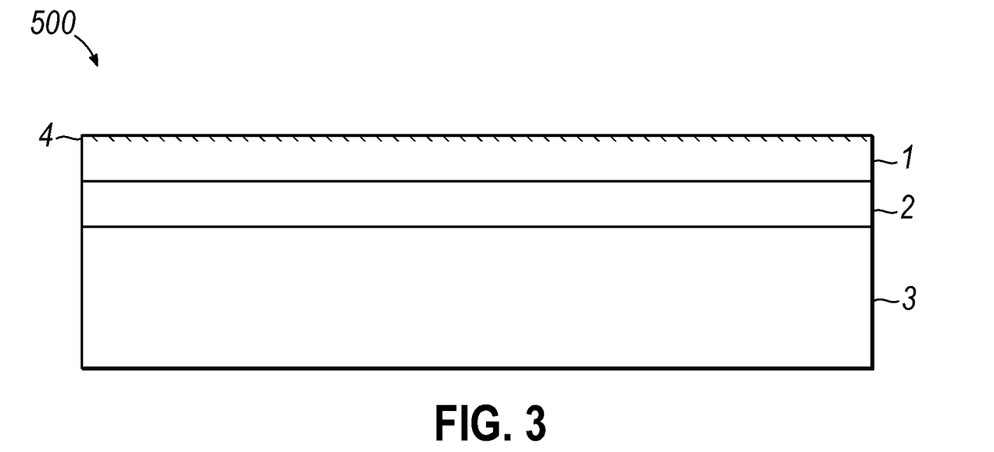
FIG. 3 is a schematic side view of another bedding or seating product such as a cushion and/or mattress implementing the coating described herein.

FIG. 3 is an example of an article 500, such as a cushion and/or a mattress. The base of the section is a prime foam layer 3. On top of this is a 2-inch (5 cm) standard, open-celled viscoelastic (visco) layer 2. The top layer is a 2-inch (5 cm) layer of flexible cellular foam product or fabric product 1 including a flexible cellular foam substrate or fabric coated with highly thermally-conductive nanomaterial coating layer 4. It will be appreciated that the dimensions given in the examples and descriptions of the various Figures are merely illustrative and are not intended to be limiting. Throughout the drawings, the same or similar reference numerals will be used for the same or similar structures.

Figure 4:
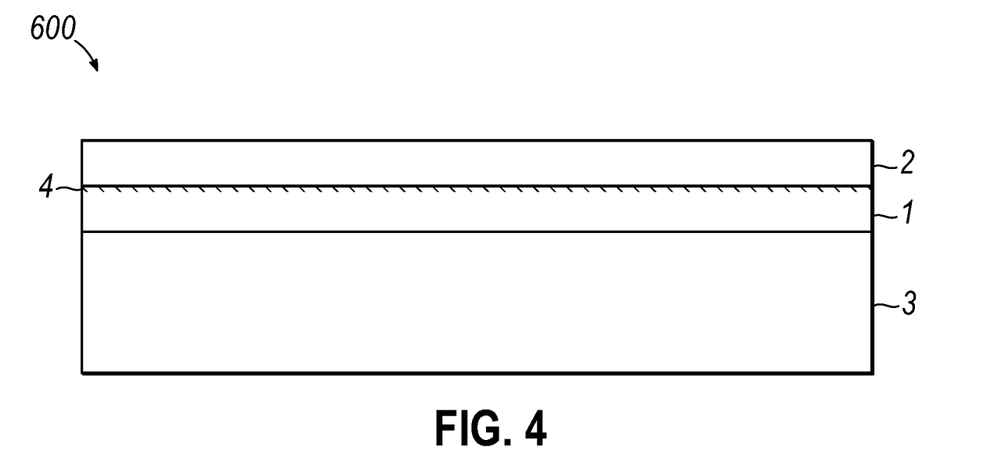
FIG. 4 is a schematic side view of another bedding or seating product such as a cushion and/or mattress implementing the coating described herein.

FIG. 4 is an example of an article 600, such as a cushion and/or mattress. The base of the section is a prime foam layer 3. On top of this is a 2-inch (5 cm) layer of flexible cellular foam product or fabric product 1 including a flexible cellular foam substrate or fabric coated with highly thermally-conductive nanomaterial coating layer 4 followed by a 2-inch (5 cm) layer of standard, open-celled viscoelastic foam 2.

Figure 5:
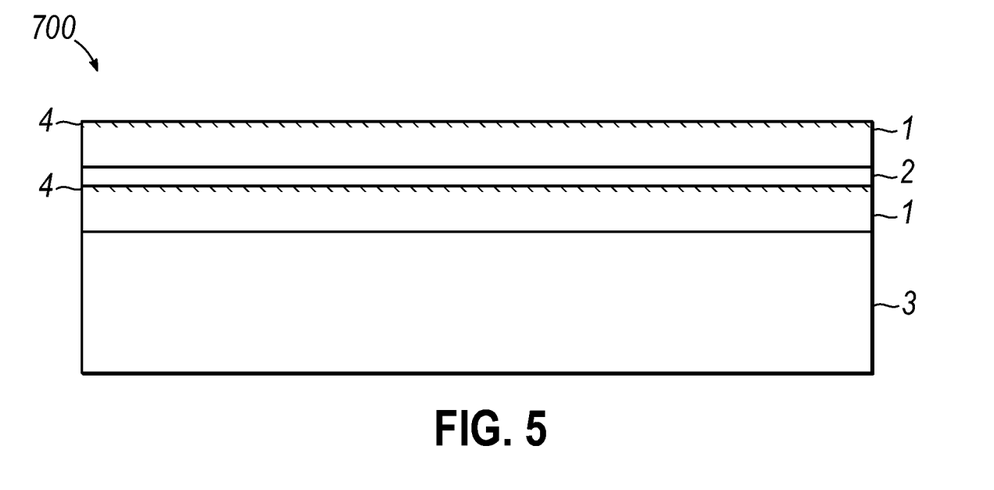
FIG. 5 is a schematic side view of another bedding or seating product such as a cushion and/or mattress implementing the coating described herein.

FIG. 5 is an example of an article 700, such as a cushion and/or mattress. The base of the section is a prime foam layer 3. On top of this is a 2-inch (5 cm) layer of flexible cellular foam product or fabric product 1 including a flexible cellular foam substrate or fabric coated with highly thermally-conductive nanomaterial coating layer 4 followed by a 0.75 inch (1.9 cm) layer 3 of prime foam. The top layer is a second 2-inch (5 cm) layer of flexible cellular foam product or fabric product 1 including a flexible cellular foam substrate or fabric coated with highly thermally-conductive nanomaterial coating layer 4.

Figure 6:
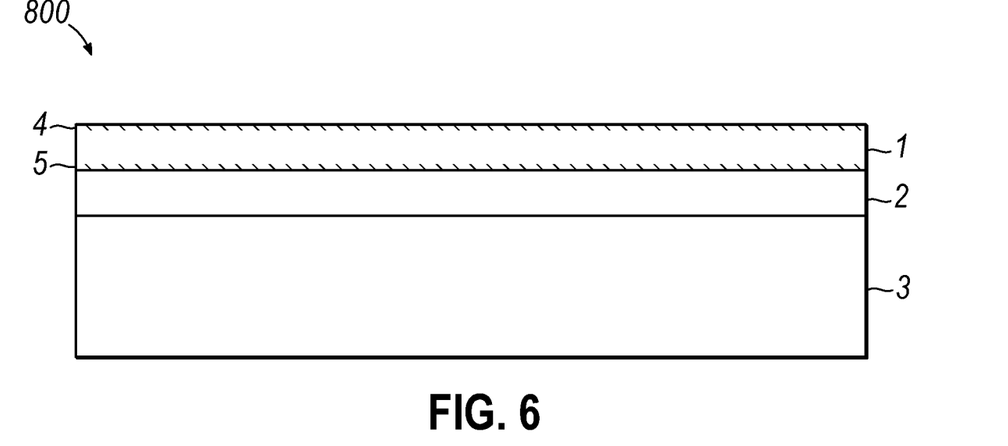
FIG. 6 is a schematic side view of another bedding or seating product such as a cushion and/or mattress implementing the coating described herein.

FIG. 6 is an example of an article 800, such as a cushion and/or mattress. The base of the section is a prime foam layer 3. On top of this is a 2-inch (5 cm) standard, open-celled viscoelastic (visco) layer 2. The top layer is a second 2-inch (5 cm) layer of flexible cellular foam product or fabric product 1 including a flexible cellular foam substrate or fabric coated with highly thermally-conductive nanomaterial coating layer 4 on one surface, and the flexible cellular foam product or fabric product 1 including a flexible cellular foam substrate or fabric is coated with highly thermally-conductive nanomaterial coating layer 5 on another surface.

Figure 7:
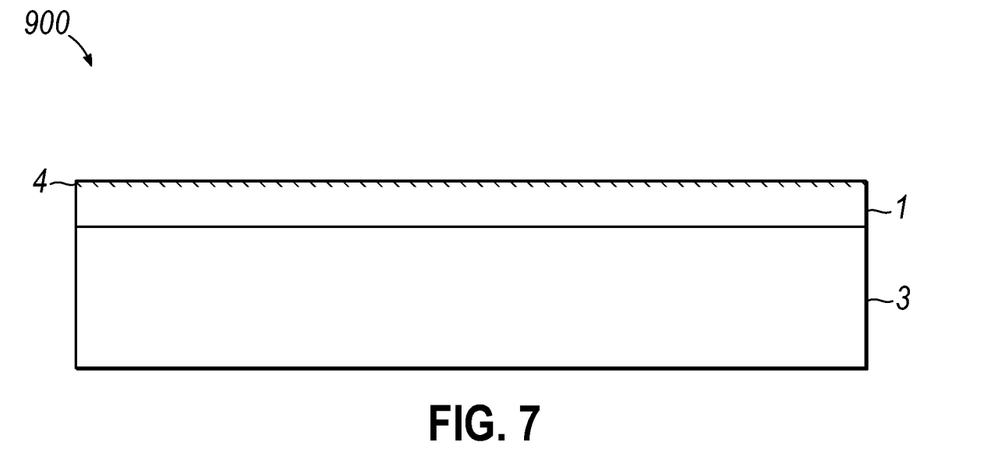
FIG. 7 is a schematic side view of another bedding or seating product such as a cushion and/or mattress implementing the coating described herein.

FIG. 7 is an example of an article 900, such as a cushion and/or mattress. The base of the section is a prime foam layer 3. On top of this is a 3-inch layer of flexible cellular foam product or fabric product 1 coated with highly thermally-conductive nanomaterial coating layer 4.

Figure 8:
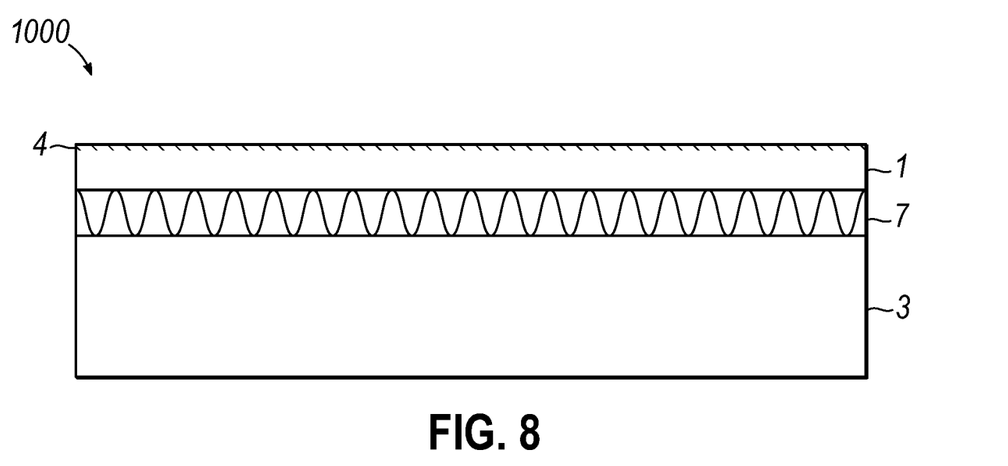
FIG. 8 is a schematic side view of another bedding or seating product such as a cushion and/or mattress implementing the coating described herein.

FIG. 8 is an example of an article 1000, such as a cushion and/or mattress. The base of the section is a prime foam layer 3. On top of this is a 3-inch (7.6 cm) layer of flexible cellular foam product or fabric product 1 including a flexible cellular foam substrate or fabric coated with highly thermally-conductive nanomaterial coating layer 4. The interface 7 between the two layers is a non-planar convolution, which may be made by convoluting the surface of either or both interfacing layers, such as the flexible cellular foam product or fabric product 1 including a flexible cellular foam substrate or fabric coated with highly thermally-conductive nanomaterial coating layer 4 and the prime foam layer 3.

Figure 9:
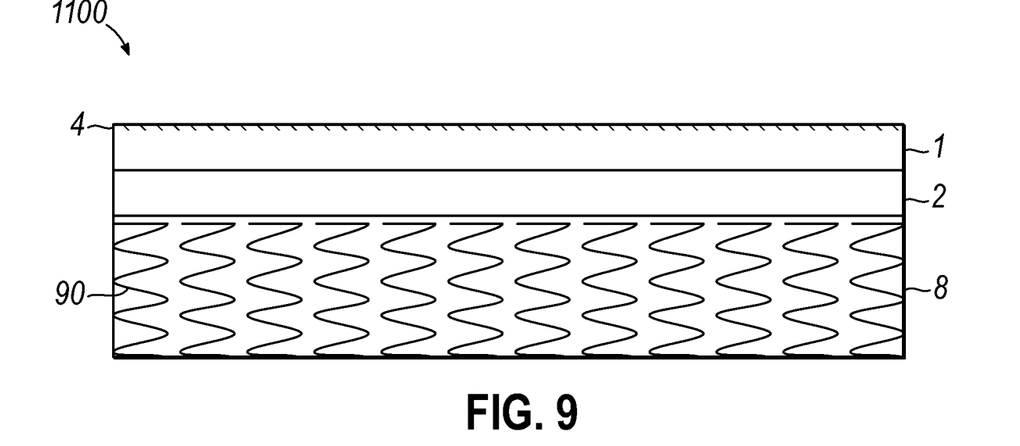
FIG. 9 is a schematic side view of another bedding or seating product such as a cushion and/or mattress implementing the coating described herein.

FIG. 9 is an example of an article 1100, such as a cushion and/or mattress. The base of the section is a spring layer 8. FIG. 9 shows a non-limiting example of a hybrid mattress, that includes both flexible cellular foam and springs 90. The springs 90 may be standard coil units or pocket coils. On top of this is a 2-inch (5 cm) layer of flexible cellular foam product or fabric product 1 coated with highly thermally-conductive nanomaterial coating layer 4. The top of this example is a 2-inch (5 cm) layer 2 of standard, open-celled viscoelastic foam.

Figure 10:
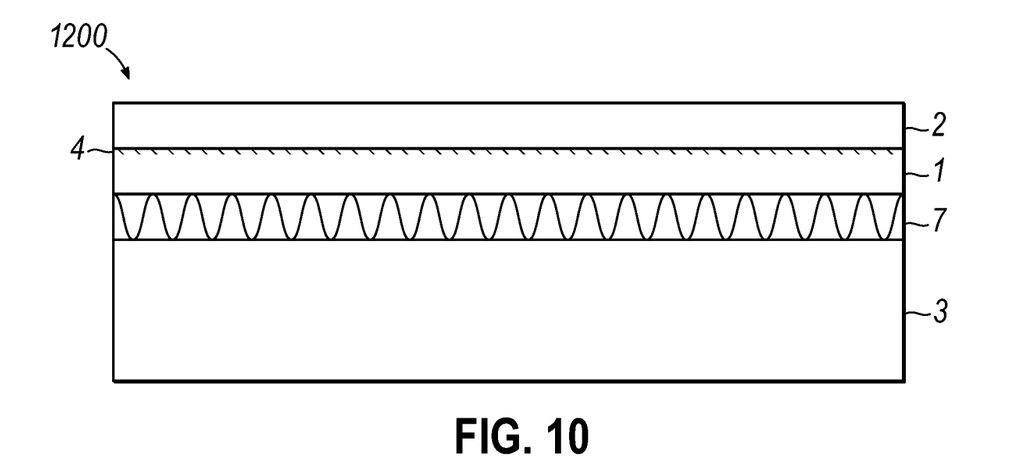
FIG. 10 is a schematic side view of another bedding or seating product such as a cushion and/or mattress implementing the coating described herein.

FIG. 10 is an example of an article 1200, such as a cushion and/or mattress. The base of the section is a prime foam layer 3. Above this is a 2-inch layer (5 cm) of flexible cellular foam product or fabric product 1 including a flexible cellular foam substrate or fabric coated with highly thermally-conductive nanomaterial coating layer 4. The interface 7 between the two layers is a non-planar convolution, which may be made by convoluting the surface of either or both interfacing layers such as the flexible cellular foam product or fabric product 1 including a flexible cellular foam substrate or fabric coated with highly thermally-conductive nanomaterial coating layer 4 and layer of standard, open-celled viscoelastic foam. On top of the flexible cellular foam or fabric 1 is a 2-inch (5 cm) standard, open-celled viscoelastic (visco) layer 2.

Figure 11:
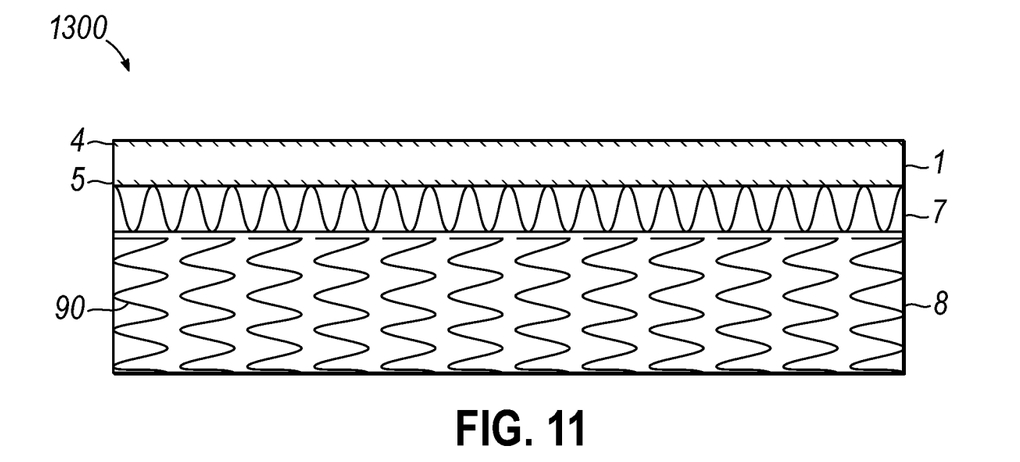
FIG. 11 is a schematic side view of another bedding or seating product such as a cushion and/or mattress implementing the coating described herein.

FIG. 11 is an example of an article 1300, such as a cushion and/or mattress. The base of the section is a springs layer 8. FIG. 11 shows a non-limiting example of a hybrid mattress, which includes both flexible cellular foam and springs 90. The springs 90 may be standard coil units or pocket coils. Above this is a 2-inch (5 cm) layer of flexible cellular foam product or fabric product 1 including a flexible cellular foam substrate or fabric coated with highly thermally-conductive nanomaterial coating layer 4. The flexible cellular foam product or fabric product 1 including a flexible cellular foam substrate or fabric is also coated on another surface with highly thermally-conductive nanomaterial coating layer 5. The interface 7 between the two layers is a non-planar convolution, which may be made by convoluting the surface of either or both interfacing layers, such as the flexible cellular foam product or fabric product 1 coated with highly thermally-conductive nanomaterial coating layer 4 and highly thermally-conductive nanomaterial coating layer 5.

Figure 12:
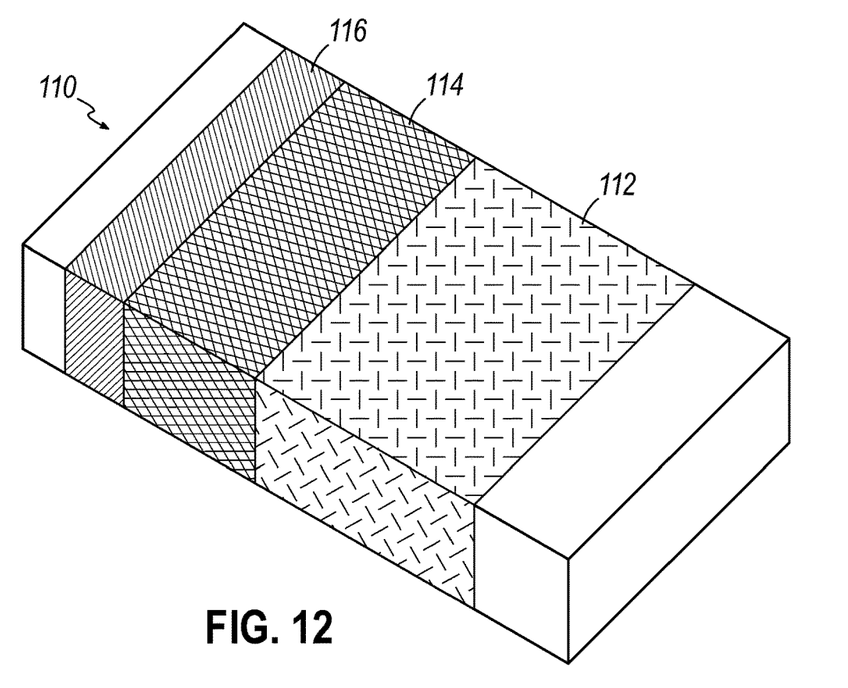
FIG. 12 is a perspective view of another bedding or seating product such as a cushion and/or mattress implementing the coating described herein.

FIG. 12 is an example breakdown of lateral mattress zones or sections in a mattress 110. FIG. 12 shows a lower body zone or section 112, torso/"belly band" zone or section 114, and head and shoulders zone or section 116. These zones or sections may or may not include a flexible cellular foam product or fabric product including a flexible cellular foam substrates or fabric coated with a highly thermally-conductive nanomaterial coating layer, example constructions, other mattress layer constructions, or any variation thereof. Furthermore, the zones shown are not limiting, but used as an example to show the possibility of utilizing enhanced thermally dissipating layers in specific areas of cushions and/or a mattress. Even further, each of the zones or sections 112, 114, 116 may be individually coated with any combination of the same or different coating formulations of HTCN coating according to the previously described formulations. For example, in a preferred embodiment, the torso/"belly band" zone or section 114, that is the zone or section 114 between zones or sections 112, 116, may be associated with a section of the mattress 110 that is intended to support the abdomen of a human user of the mattress 110. At least because the abdomen of a human user has a greater heat flux during sleep than some other parts of a human user, the coating on the mattress 110 in the zone or section 114 may be configured to have a greater heat conductivity or heat effusivity than the coatings on the adjacent zones or sections 112, 116. There may be any number of zones or sections having different coatings applied thereon, though FIG. 12 shows three such zones or sections 112, 114, 116. Furthermore, any one or more of the zones or sections 112, 114, 116 may have the coating applied uniformly across the zone or section, non-uniformly, or in a patterned arrangement. As shown in FIG. 12, in an embodiment only a portion of the outer surface of a flexible cellular foam substrates or fabric is coated with a highly thermally-conductive nanomaterial coating layer. Alternatively, in an embodiment, the entire outer surface of a flexible cellular foam substrates or fabric is coated with a highly thermally-conductive nanomaterial coating layer. It is within the scope of the present invention that two different coatings cover only the upper surfaces of two different zones of a product such as a mattress. For example, a first coating covers only the upper surface of a first zone and a second coating different than the first coating covers only the upper surface of a second zone of the product. It is also within the scope of the present invention that the same coating covers only the upper surfaces of two or more different zones of a product such as a mattress.

Figure 13:
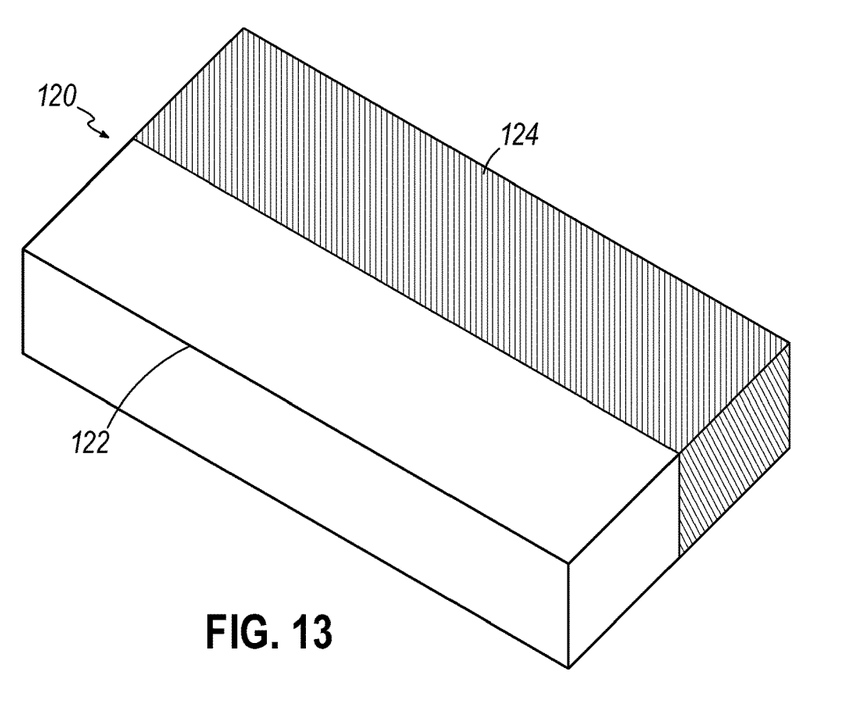
FIG. 13 is a perspective view of another bedding or seating product such as a cushion and/or mattress implementing the coating described herein.

FIG. 13 is an example breakdown of longitudinal mattress zones or section 122 and 124 in a mattress 120. FIG. 13 shows a left section 122 and right section 124. These zones or sections 122 and 124 may or may not include a flexible cellular foam product or fabric product including a flexible cellular foam substrates or fabric coated with a highly thermally-conductive nanomaterial coating layer, example constructions, other mattress layer constructions, or any variation thereof. Furthermore, the zones shown are not limiting, but used as an example to show the possibility of utilizing enhanced thermally dissipating layers in specific areas of cushions and/or a mattress. Even further, each of the longitudinal mattress zones 122, 124 may be individually coated with any combination of the same or different coating formulations of HTCN coating according to the previously described formulations. For example, in a preferred embodiment, longitudinal mattress zone 122 may be associated with a section of the mattress 120 that is intended to support a human user that happens to experience a greater heat flux during sleep than a partner with whom the human user shares the mattress 120 with. Accordingly, the coating on the mattress 110 in the longitudinal mattress zone 122 may be configured to have a greater heat conductivity or heat effusivity than the coating on the adjacent longitudinal mattress zone 124. There may be any number of longitudinal mattress zones having different coatings applied thereon, though FIG. 13 shows two such zones 122, 124. Furthermore, each longitudinal mattress zone 122, 124 may have the coating applied uniformly across the longitudinal mattress zone, non-uniformly, or in a patterned arrangement.

Figure 14:
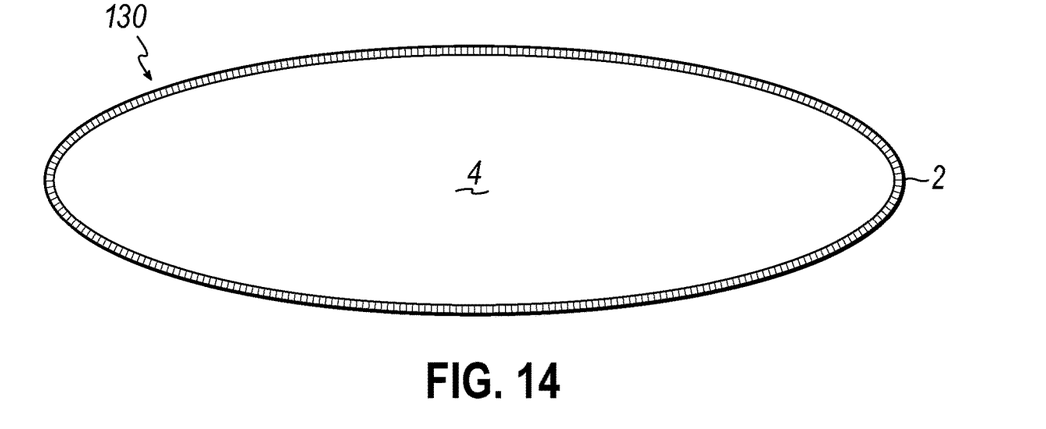
FIG. 14 is a cross-sectional view of a molded pillow product where a surface of a flexible cellular foam or fabric is coated with highly thermally-conductive nanomaterials.
Figure 15:
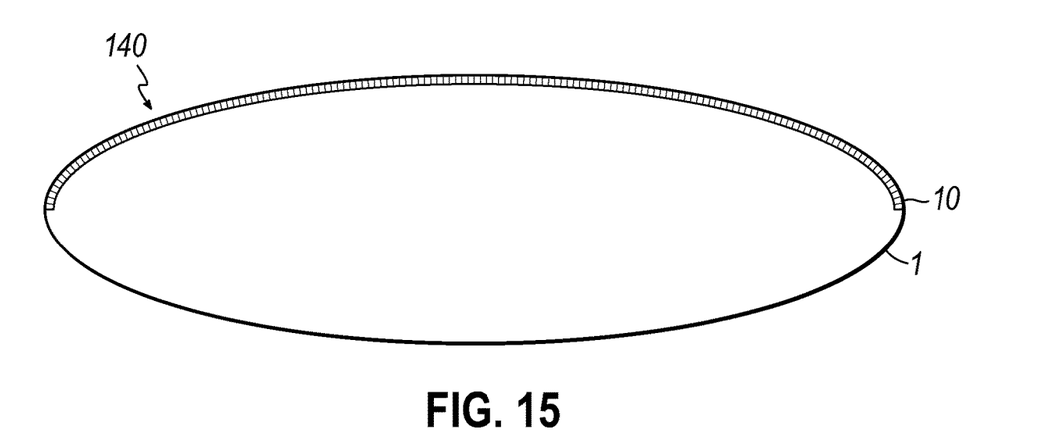
FIG. 15 is a cross-sectional view of a molded pillow product where a portion of the surface of a flexible cellular foam or fabric is coated with highly thermally-conductive nanomaterials.

FIGS. 14 and 15 are depictions of molded pillow systems. FIG. 14 is a pillow 130 molded entirely out of flexible cellular foam substrate or covered in fabric and then coated with highly thermally-conductive nanomaterial coating layer 4. FIG. 15 shows a pillow using a flexible cellular foam product or fabric product including a flexible cellular foam substrate or fabric coated with highly thermally-conductive nanomaterial coating layer 4 as a region of the overall pillow structure 10.

Figure 16:
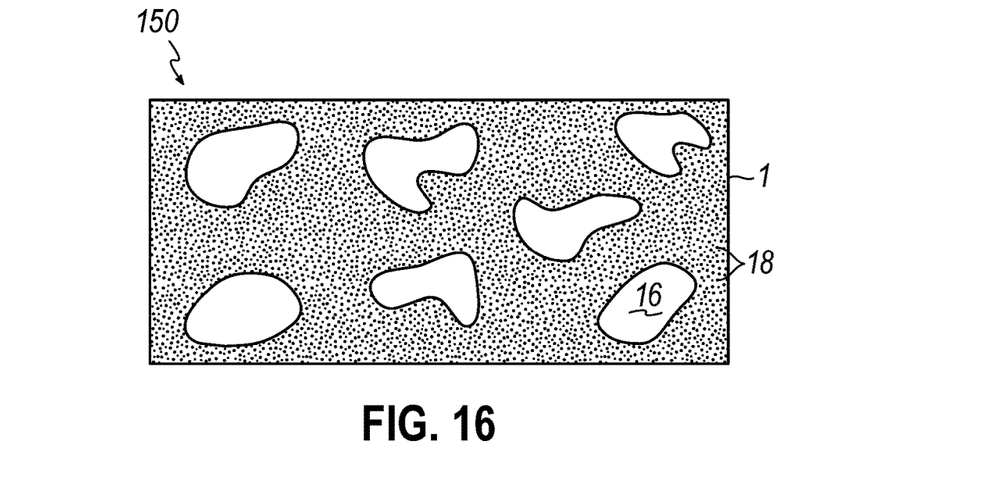
FIG. 16 is an enlarged view of a surface of a flexible cellular foam or fabric including a coating having highly thermally conductive nanomaterials and highly thermally conductive materials that are larger than nano-sized.

FIG. 16 is a zoomed in view of a surface of a flexible cellular foam or fabric including a coating 150 having highly thermally conductive nanomaterials 18 and highly thermally conductive materials 16 that are larger than nano-sized. As shown in FIG. 16, the highly thermally conductive nanomaterials 18 fill in gaps between highly thermally conductive materials 16 that are larger than nano-sized. This configuration provides increased contact between highly thermally conductive materials in the coating, and provides increased heat dissipation throughout the coating 150 compared to coatings without highly thermally conductive nanomaterials 18.

While this detailed description has set forth particularly suitable embodiments of this invention, numerous modifications and variations of the structure of this invention, all within the scope of the invention, will readily occur to those skilled in the art. Accordingly, it is understood that this description is illustrative only of the principles of the invention and is not limitative thereof. Although specific features of the invention are shown in some of the drawings and not others, this is for convenience only, as each feature may be combined with any and all of the other features in accordance with this invention. Other embodiments may occur to those skilled in the art and are within the following claims.

The words "comprising" and "comprises" as used throughout the claims is interpreted "including but not limited to". The present invention may suitably comprise, consist or consist essentially of the elements disclosed and may be practiced in the absence of an element not disclosed. The invention as described above is meant to be illustrative and not limiting, and accordingly, the present invention is defined as provided in the appended claims.

What is claimed is:

1. A flexible cellular foam product comprising:
a flexible open-celled polyether polyurethane foam substrate having at least one surface; and
a coating layer comprising a highly thermally conductive nanomaterial comprising a graphene nanoplatelet, and a binder comprising a styrene-acrylic emulsion polymer on the at least one surface of the flexible foam substrate, the binder binding the highly thermally conductive nanomaterial of the coating layer to the at least one surface of the flexible foam substrate,
the highly thermally conductive nanomaterial being present on the at least one surface of the flexible open-celled polyether polyurethane foam substrate, and not interposed within the flexible open-celled polyether polyurethane foam substrate, and the coating layer further comprises a microencapsulated phase change material comprising n-octadecane.

2. The flexible cellular foam product of claim 1, wherein the coating layer comprises between 0.0001 wt % and 50 wt % highly thermally conductive nanomaterials.

3. The flexible cellular foam product of claim 1, wherein the highly thermally conductive nanomaterials have a thermal conductivity of greater than 5 W/(m-K).

4. The flexible cellular foam product of claim 1, wherein the coating layer is present on the surface of the flexible open-celled polyether polyurethane foam substrate in a thickness of between 10 g/m$^2$ and 25,000 g/m$^2$, inclusively.

5. The flexible cellular foam product of claim 1, wherein the highly thermally conductive nanomaterial has a length in at least one dimension of between about 1 nm independently and 1,000 nm.

6. The flexible cellular foam product of claim 1, wherein the coating layer further comprises an extender comprising talc.

7. The flexible cellular foam product of claim 1, wherein the coating layer further comprises a stabilizer in an amount up to about 5 wt %.

8. The flexible cellular foam product of claim 1, wherein the coating layer further comprises:
a surfactant in an amount between about 0.01 wt % independently and about 5 wt %; and
an extender comprising talc.

* * * * *